(12) United States Patent
Pani

(10) Patent No.: US 12,339,646 B2
(45) Date of Patent: Jun. 24, 2025

(54) STATE MACHINE MOTOR CONTROLLER

(71) Applicant: Microchip Technology Incorporated, Chandler, AZ (US)

(72) Inventor: Radhakrishna Pani, Karnataka (IN)

(73) Assignee: Microchip Technology Incorporated, Chandler, AZ (US)

( * ) Notice: Subject to any disclaimer, the term of this patent is extended or adjusted under 35 U.S.C. 154(b) by 392 days.

(21) Appl. No.: 17/874,407

(22) Filed: Jul. 27, 2022

(65) Prior Publication Data

US 2023/0121985 A1 Apr. 20, 2023

(30) Foreign Application Priority Data

Oct. 18, 2021 (IN) .............................. 202111047190

(51) Int. Cl.
*G05B 19/4155* (2006.01)
(52) U.S. Cl.
CPC .................. *G05B 19/4155* (2013.01); *G05B 2219/41329* (2013.01)
(58) Field of Classification Search
None
See application file for complete search history.

(56) References Cited

U.S. PATENT DOCUMENTS

| 6,100,823 | A  | * | 8/2000 | Copper | H02P 6/16 341/11 |
| 6,215,261 | B1 |   | 4/2001 | Becerra | 318/400.26 |
| 2002/0089301 | A1 | * | 7/2002 | Slater | H02P 25/089 318/701 |
| 2003/0231875 | A1 |   | 12/2003 | Masino | 388/800 |
| 2018/0172480 | A1 | * | 6/2018 | Courtel | G01D 5/24461 |

FOREIGN PATENT DOCUMENTS

WO 2015/004472 A2 1/2015 ............... G01D 5/14

OTHER PUBLICATIONS

Wei et al., "Rotor Position Estimation Method for BSM Based on Sogi in the Starting Mode", Jul. 2020, IEEE Transactions on Industrial Electronics, vol. 67, No. 7, pp. 6135-6145 (Year: 2020).*
Balazovic, Peter et al., "3-Phase Switched Reluctance Motor Control with Encoder Using DSP56F80x," URL: https://www.nxp.com/docs/en/application-note/AN1937.pdf, 56 pages, Jan. 1, 2005.
International Search Report and Written Opinion, Application No. PCT/US2022/039783, 14 pages, Oct. 31, 2022.

* cited by examiner

*Primary Examiner* — David Earl Ogg
(74) *Attorney, Agent, or Firm* — SLAYDEN GRUBERT BEARD PLLC

(57) ABSTRACT

A state machine motor controller (SMMC) interface comprises a plurality of states which defines a unique set of poles/motor phase/phases energized. Digital sensors capture the start of overlap of rotor poles with stator poles. The state change occurs when a rotor pole starts overlapping with a stator pole. The number of states depends on the number of phases and the design of the motor. The SMMC has up to four inputs to accept rotational information from digital sensors and can control motors having up to 16 states. A sequencer is used to keep track of state changes and provides a next state depending on forward/reverse direction setting and braking setting. A counter provides rotational speed based upon the number of clock pulses per time period for a state change. The sequencer checks for a faulty sensor(s) and generates a fault interrupt therefrom.

20 Claims, 14 Drawing Sheets

Detailed Block Diagram

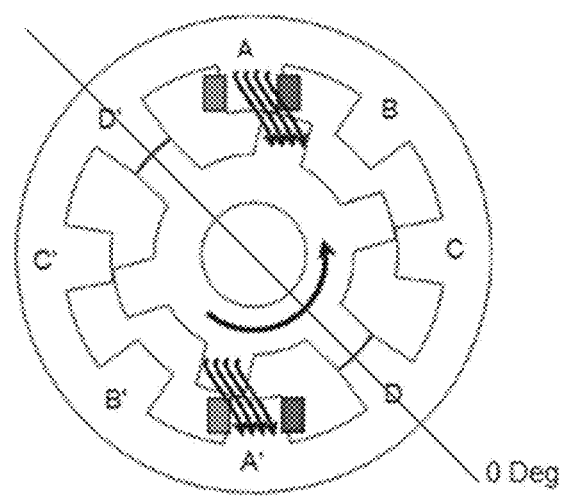 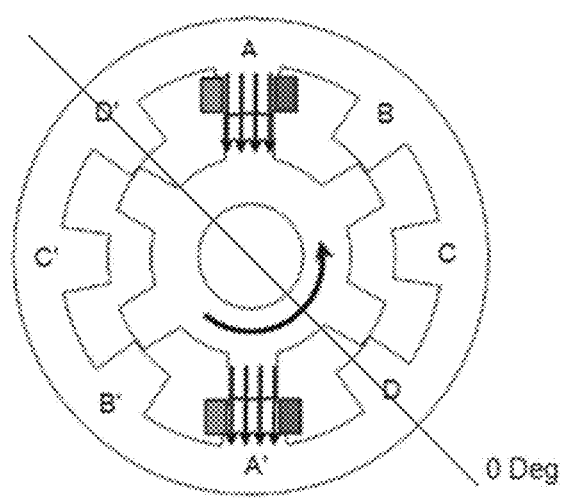
(a) SRM - unaligned position  (b) SRM - aligned position
Four-Phase Switched Reluctance Motor
FIGURE 3

Power Control Circuit for a Four-Phase Switched Reluctance Motor

| States | State 0 | State 1 | State 2 | State 3 | State 4 | State 5 | State 6 | State 7 |
|---|---|---|---|---|---|---|---|---|
| Sensor Reading | 0x5 | 0x7 | 0x3 | 0x2 | 0x1 | 0x0 | 0x4 | 0x6 |
| Forward | State 0 | State 1 | State 2 | State 3 | State 4 | State 5 | State 6 | State 7 |
| Reverse | State 4 | State 5 | State 6 | State 7 | State 0 | State 1 | State 2 | State 3 |
| Forward Breaking | State 5 | State 6 | State 7 | State 0 | State 1 | State 2 | State 3 | State 4 |
| Reverse Breaking | State 1 | State 2 | State 3 | State 4 | State 5 | State 6 | State 7 | State 0 |

| Rotor Angle (degree) | State | Phase energized |
|---|---|---|
| 0 to 10 | 0x0 | A |
| 10 to 15 | 0x1 | A and B |
| 15 to 25 | 0x2 | B |
| 25 to 30 | 0x3 | B and C |
| 30 to 40 | 0x4 | C |
| 40 to 45 | 0x5 | C and D |
| 45 to 55 | 0x6 | D |
| 55 to 60 | 0x7 | D and A |

Four Phase Switched Reluctance Motor States definition

FIGURE 5

| SD | Sensor Data |
| CS | Current State |
| VS | Valid State |
| ES | Expected State |
| BR | Braking |
| FR | Forward/Reverse |
| NS | Next State |
| CNT | Counter |
| OVF | Overflow |

Legends for waveform plots

FIGURE 6

Waveform of SRM rotating in reverse direction

BLDC motor

HALL States Overview

| States | State 0 | State 1 | State 2 | State 3 | State 4 | State 5 |
|---|---|---|---|---|---|---|
| Sensor Reading | 0x1 | 0x5 | 0x4 | 0x6 | 0x2 | 0x3 |
| Forward | State 0 | State 1 | State 2 | State 3 | State 4 | State 5 |
| Reverse | State 3 | State 4 | State 5 | State 0 | State 1 | State 2 |
| Forward Breaking | State 3 | State 4 | State 5 | State 0 | State 1 | State 2 |
| Reverse Breaking | State 0 | State 1 | State 2 | State 3 | State 4 | State 5 |

| State | Sensor Data | Energized Phase |
|---|---|---|
| 0 | 1 | A-B |
| 1 | 5 | A-C |
| 2 | 4 | B-C |
| 3 | 6 | B-A |
| 4 | 2 | C-A |
| 5 | 3 | C-B |

Three Phase BLDC motor states definition

FIGURE 11

| SD | Sensor Data |
| CS | Current State |
| VS | Valid State |
| ES | Expected State |
| BR | Braking |
| FR | Forward/Reverse |
| NS | Next State |
| CNT | Counter |
| OVF | Overflow |

Legends for waveform plots

FIGURE 12

Waveform of BLDC motor rotating in forward direction

Waveform of BLDC motor rotating in reverse direction

STATE MACHINE MOTOR CONTROLLER

This application claims priority to commonly owned India Patent Application number 2021/11047190, filed Oct. 18, 2021 entitled "State Machine Motor Controller," which is hereby incorporated by reference herein for all purposes.

TECHNICAL FIELD

The present disclosure relates to motor controllers, and, more particularly, to motor controllers comprising a position decoder (PDEC).

BACKGROUND

A Switched Reluctance Motor (SRM) is being considered, nowadays, for applications ranging from low power servomotors to high power traction drives. Motors of power ratings varying from 4 to 22 kW are commercially available at present for many applications. The SRM is a motor which has a stator and a rotor like a conventional motor. The stator is constructed from magnetic materials and has conductors (windings) to produce magnetic fields but differs in rotor construction to a brushed DC motor or Permanent Magnet DC motor. In an SRM, the rotor is constructed from magnetic materials but has no windings or permanent magnet and the number of poles on its stator and rotor are not equal. The rotor rotates due to reluctance torque produced by the magnetic field generated in the stator windings.

The SRM is a double salient machine, which means both stator and rotor have projected poles. FIG. 3 shows energized one phase winding of a four-phase switched reluctance motor having 8 poles on stator and 6 poles on rotor. While the rotor has no windings, each stator pole has a concentrated winding around it and each pair of diametrically opposite coils comprise one phase of the motor. These motors are designed for applications different from those for which stepper motors are designed. Though various combinations of stator and rotor pole numbers are possible in SRMs, the most commonly used are stator/rotor: 8/6 and 6/4. The stator has concentrated coils and diametrically opposite coils are connected in series or parallel to provide one phase. Thus, motors with pole numbers 6/4 and 8/6 will have three and four phases respectively.

In the SRM the number of stator and rotor poles are in multiples of two (2) but they are not equal. This non-symmetry means there are fewer rotor poles which are not aligned with the stator poles. When the non-aligned stator poles are energized, the magnetic field generated will have a higher reluctance path to flow through the adjacent rotor pole. This high reluctance generates torque in the rotor to align it with the stator. Once the alignment is complete the current set of aligned stator poles are de-energized and a next set of unaligned stator poles are energized. This process is repeated to produce almost continuous torque resulting in a uniform rotation of the rotor. The synchronization of the switching on the excitation with rotor position can be accomplished with simple rotor position feedback. The motor can also provide regenerative braking. If a phase is excited after the rotor has crossed the position of minimum reluctance, the rotor will experience a torque in opposition to its motion, it will decelerate, and mechanical energy drawn from it will be converted into electrical energy and supplied to the source. In fact, the possibility of operating in all of the four quadrants of the speed-torque plane and obtaining flexible speed-torque characteristics simply by appropriate switching of current pulses makes the SRM very versatile. Since there are no windings on the rotor, the SRM is robust and can be run at very high rotational speeds.

From the working principle of SRM it can be understood it is very important to know when the rotor poles start to overlap with one set of stator poles and energize those stator poles to achieve maximum torque and to increase motor efficiency. In the SRM pole reversal may not be implemented as the rotor has no electro/permanent magnet, therefore an H-bridge may not be implemented. The control circuit of a SRM may consist of pair of transistors/MOSFET's to control switching of each phase, see FIG. 4 for a four phase SRM. Depending on the rotor position one or two phases may be energized, e.g., the duty cycle of two phases may overlap.

In the motor control industry, currently QEI/PDEC interfaces provide solutions to identify the rotor position but on a polling basis. A user cannot know the initial state of the rotor but has to get the rotor to a known position.

A brushless direct current (BLDC) motor may use rotor position sensors such as Hall effect sensors to determine at which position (state) the BLDC rotor is currently placed. A PDEC interface working in Hall mode will check the state transitions of the Hall sensors and derive therefrom the rotation of the motor rotor. The PDEC interface working in Hall mode is generally used to control a BLDC motor, however, it may not be suitable to control an SRM which use is becoming more prevalent.

SUMMARY

Therefore, examples herein provide a way to determine when the rotor poles start to overlap with one set of stator poles in a SRM, and to energize those stator poles to achieve maximum torque and increase motor efficiency.

According to one aspect, there is provided a state machine motor controller interface, comprising: an edge detector having a plurality of first inputs and a plurality of first outputs, wherein each of the plurality of first inputs is adapted for coupling to a respective one of a plurality of position sensors whereby each of the plurality of position sensors indicates a different motor rotor angle range, when a first input receives a sensor output from an associated position sensor, a state thereof is determined based upon a sensor output logic value, wherein each state is defined by a logic value stored in a register and compared with the sensor output logic value after the transition thereof, and wherein one of the plurality of first outputs provides the state and another one of the plurality of first outputs provides a state change pulse; a sequencer comprising: a state input coupled to the state output from the edge detector, a state change pulse input coupled to the state change pulse output from the edge detector, a valid state change event/interrupt output, and a plurality of definition registers for defining expected states, comparison logic for validating the state received from the edge detector with an associated one of the expected states, a next expected state is updated if the received state is valid before an overflow is received from a counter and a valid state change event/interrupt is generated, and if not until counter overflow condition the next expected state is not updated and a fault interrupt is generated; a counter having a clock input coupled to a clock and a count value output, wherein the counter increments a count value for a clock pulse received until a valid state pulse is received from the sequencer, whereby the count value will be stored in a count register and the count value of the counter will be reset to zero, and if the count value exceeds a maximum count then an overflow output will be generated.

Another aspect provides a state machine motor controller comprising: a processor; a transitory storage medium comprising a plurality of registers for storing user-define parameters and processed data comprising: a plurality of definition registers for defining expected rotor states; a plurality of definition registers for defining next rotor states; and a non-transitory storage medium comprising a set of computer readable instructions stored in the non-transitory storage medium and when executed by the processor configured to control the controller to: calculate rotor states based on user-defined parameters and store the rotor states in the plurality of definition registers for defining expected rotor states in the transitory storage medium; determine an initial rotor state based on rotor position input data; store a next rotor state in the plurality of definition registers for defining next rotor states; store an expected rotor state in the plurality of definition registers for defining expected rotor states; detect changes in rotor state based on rotor position input data; validate a rotor state as an expected rotor state and reset a counter; determine a next rotor state based on user-defined parameters and the expected rotor states in the transitory storage medium and load the next rotor state in one of the plurality of registers for defining expected rotor states; and update the expected rotor state with the next rotor state.

According to still another aspect, there is provided a state machine motor controller comprising: a processor; a transitory storage medium comprising a plurality of registers for storing user-define parameters and processed data comprising: a control register with a length field specifying a number of rotor states; a control register with a rotor direction field specifying a direction selected from forward and reverse; a control register with a rotor braking condition field specifying a condition selected from braking and nonbraking; a plurality of definition registers for defining expected rotor states; a plurality of definition registers for defining next rotor states; and a control register with a maximum count value; and a non-transitory storage medium comprising a set of computer readable instructions stored in the non-transitory storage medium and when executed by the processor configured to control the controller to: calculate rotor states based on user-defined parameters and store the rotor states in the plurality of definition registers for defining expected rotor states in the transitory storage medium; determine an initial rotor state based on rotor position input data; store a next rotor state in the plurality of definition registers for defining next rotor states; store an expected rotor state in the plurality of definition registers for defining expected rotor states; correlate rotor position input data with rotor states; detect changes in rotor state based on rotor position input data; validate a rotor state as an expected rotor state and reset a counter; determine a next rotor state based on user-defined parameters and the expected rotor states in the transitory storage medium and load the next rotor state in one of the plurality of registers for defining expected rotor states; update the expected rotor state with the next rotor state; and count clock pulses to update a count value, compare the count value to a maximum count value, and generate an overflow when the count value exceeds the maximum count value.

BRIEF DESCRIPTION OF THE DRAWINGS

A more complete understanding of the present disclosure may be acquired by referring to the following description taken in conjunction with the accompanying drawings wherein:

FIG. 3 illustrates schematic cross section diagrams of a four-phase switched reluctance motor (SRM), according to specific examples of this disclosure;

FIG. 5 illustrates a state table for four-phase switched reluctance motor states definition, according to specific examples of this disclosure;

FIG. 6 illustrates a table of legend definitions of the waveform graphs shown in FIGS. 7 and 8, according to specific examples of this disclosure;

FIG. 11 illustrates a state table for three-phase BLDC motor states definition, according to specific examples of this disclosure;

FIG. 12 illustrates a table of legend definitions of the waveform graphs shown in FIGS. 13 and 14, according to specific examples of this disclosure;

Figure 1:
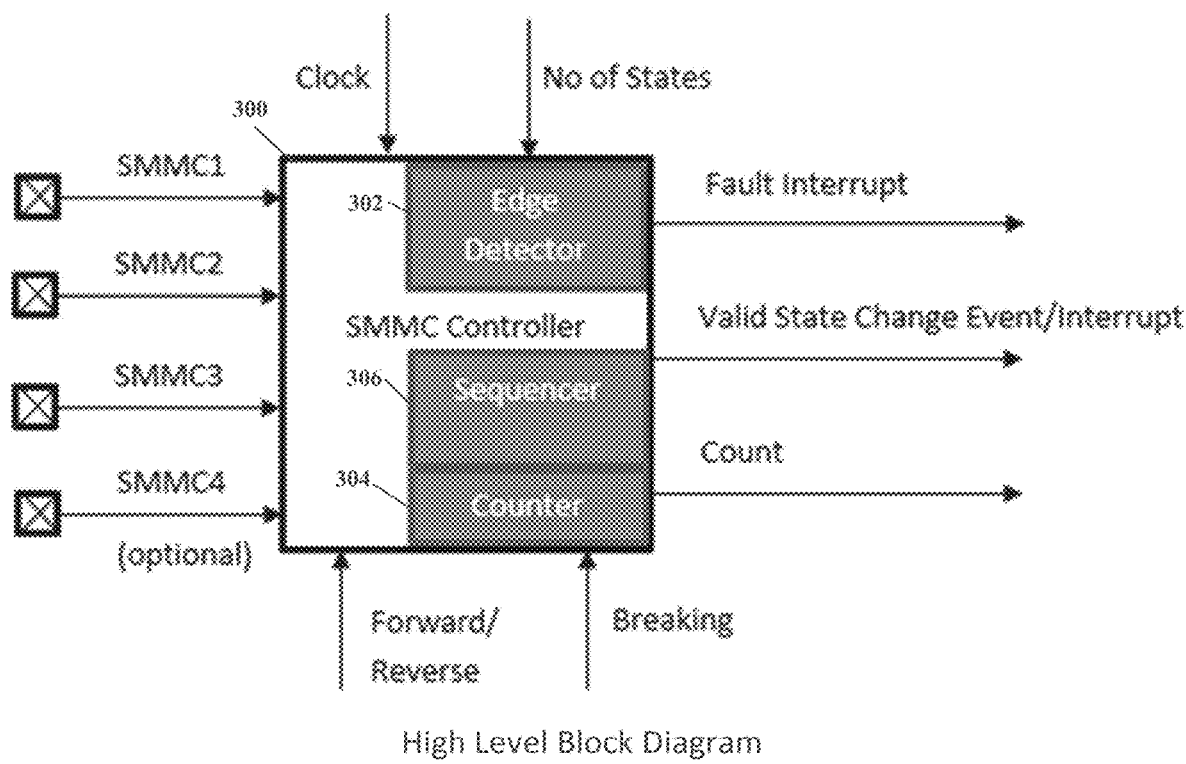
FIG. 1 illustrates a high-level schematic block diagram of a state machine motor controller (SMMC) interface, according to teachings of this disclosure.

While the present disclosure is susceptible to various modifications and alternative forms, specific examples thereof have been shown in the drawings and are herein described in detail. The description herein of specific examples is not intended to limit the disclosure to the forms disclosed herein.

DETAILED DESCRIPTION

The proposed state machine motor controller (SMMC) interface may have an architecture like a state machine. Here a state defines a unique set of poles/motor phase/phases energized. Digital sensors may be strategically placed to capture the start of overlap of rotor poles with stator poles. These digital sensors may provide rotational position as input to the SMMC described hereinafter.

It is contemplated and within the scope of this disclosure, and without limitation thereto, that the SMMC interface may have the following functions, features and advantages: (1) has up to four inputs to accept rotational information from digital sensors, e.g., proximity sensor, infrared transmitter and receiver, Hall Effect and the like, in particular, there may be two inputs or three inputs or four inputs from the sensors. (2) Can control motor having up to 16 states. (3) Can generate events/interrupts for a valid state change received. (4) Provides a sequencer that may be used to keep track of state changes of inputs and provides a next state depending on forward/reverse direction setting and braking setting. (5) A counter may provide rotational speed based upon the number of clock pulses per time period for a state change. (6) User inputted overflow value for the counter to count to generate overflow condition if valid state change is not received. (7) Sequencer can check for a faulty sensor(s) and generate a fault interrupt therefrom. (8) Supports all four-quadrant operation of a motor.

RPM or RPS is defined as the number of rotations of the motor per minute or per second, respectively. The motor RPM/RPS can be calculated from the counter counts value for a state change. Formula to calculate the same is as follows:

$$RPM = RPS*60 = \frac{\text{Angle Rotation in degree for that State} * \text{Counter Clock Frequency}}{360° * \text{Counter Count Value}} *60$$

Referring now to the drawings, the details of examples are schematically illustrated. Like elements in the drawings will be represented by like numbers, and similar elements will be represented by like numbers with a different lower-case letter suffix.

Referring to FIG. 1, depicted is a high-level schematic block diagram of a state machine motor controller (SMMC) interface 300, according to teachings of this disclosure. The SMMC interface may comprise three sub-sections: (1) edge detector 302, (2) counter 304 and (3) sequencer 306.

Figure 2:
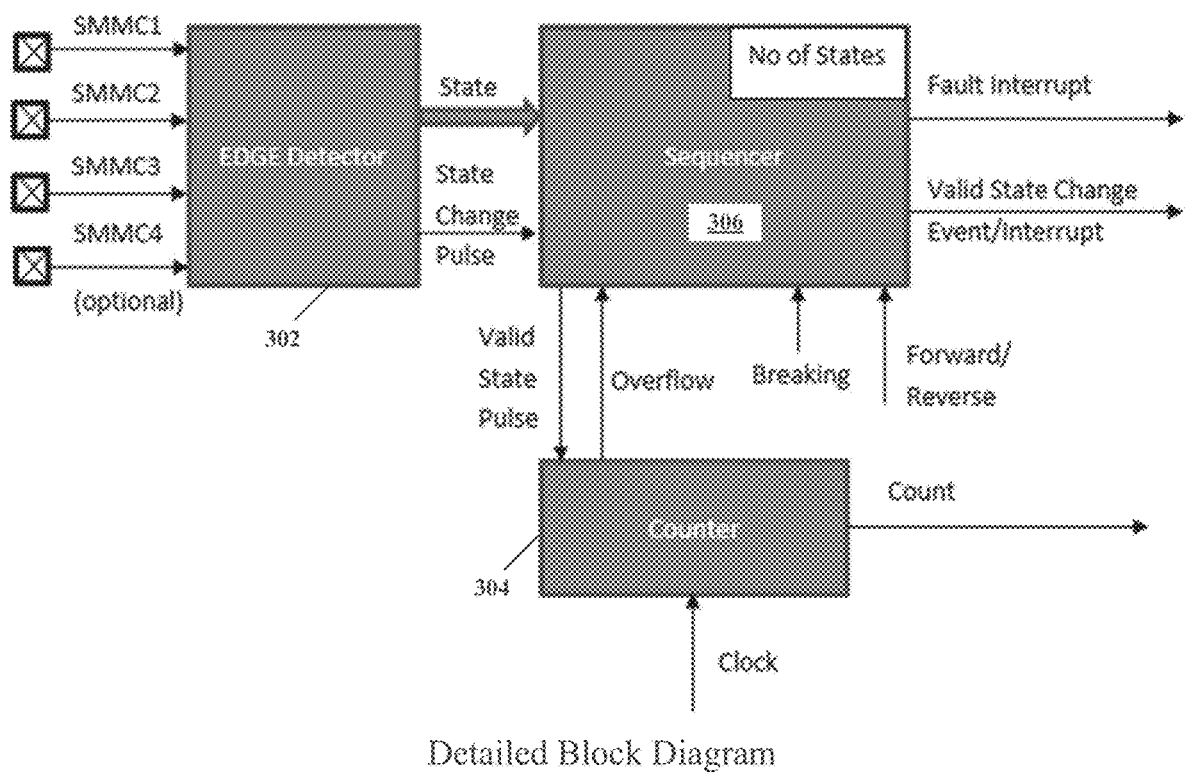
FIG. 2 illustrates a more detailed schematic block diagram of the SMMC interface shown in FIG. 1, according to teachings of this disclosure.
Figure 4:
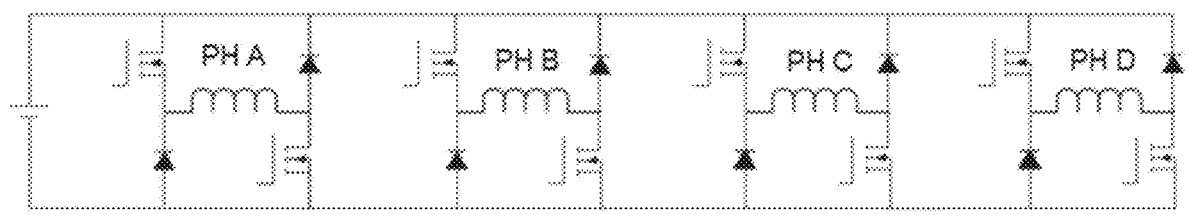
FIG. 4 illustrates a schematic diagram of a power control circuit for a four-phase switched reluctance motor (SRM), according to specific examples of this disclosure.

Referring to FIG. 2, depicted is a more detailed schematic block diagram of the SMMC interface shown in FIG. 1, according to teachings of this disclosure. The edge detector 302 will be checking for any edges (change of logic states) on the four (4) input lines SMMC1, SMMC2, SMMC3 and SMMC4. Filtering of signals thereto may be added also. Registers may be provided for the user to define a sensor logic value for each state. Both the edges (positive and negative edge) may be detected by the edge detector 302 and convert each sensor input (SMMCx) into a state, send the state to the sequencer 306 and send a pulse signal to inform an edge representing a logic state change was detected. If the sensor logic value received by the edge detector 302 is not defined in the register, then edge detector 302 may not send a pulse signal.

A clock is supplied to the counter 304. The counter 304 increments the count for a clock pulse until receiving a valid state change pulse from the sequencer 306. Once the valid state change pulse is received from the sequencer 306 the count value will be stored in a count register (not shown) and then the counter 304 will be reset to start counting again from 0. The motor rotor speed may be computed from the value read from the count register (not shown) on a state change. The user can provide a maximum count that the counter 304 may count to until receiving a valid state pulse. If the counter 304 exceeds this value, then the counter 304 will send overflow status to the sequencer 306. The clock frequency may be greater than two (2) times the absolute maximum rounds per second (RPS) multiplied by the number of states per rotor rotation.

The sequencer 306 is the heart of the SMMC interface 300. The states will begin from state 0 but the user can choose the number of states by writing into a length field in a control register (not shown) with 0xF as a maximum number of states. There may be registers (not shown) to define states for forward, reverse, forward braking and reverse braking states for each defined state. Once the sequencer 306 receives a state change pulse from the edge detector 302 it will validate the received state with the expected state. The sequencer 306 will wait for a valid state change until an overflow signal from the counter 304 is received. Once a valid state change is received, the sequencer 306 will update the next state depending on the forward/reverse and braking inputs (conditions). For example, if the current state is 0x1 then the expected state will be 0x2 if a forward condition is set or 0x0 if a reverse condition is set. The sequencer 306 will wait till the next expected state is received, or until an overflow is received from the counter 304 and a corresponding events/interrupt is generated. The sequencer 306 will determine the next state by reading the forward/reverse input and braking input, and then update the next state to a register (not shown). FIG. 5 shows the logic table for determining the next state. Once the valid state is received the sequencer 306 will update the next valid state register (not shown). The user can read this register and send the control signals, accordingly. The user may opt to have event generation or interrupt generation when a valid state is received. There may be a unique event for each state and one interrupt. FIGS. 3 to 8 provide an example on how four quadrant control is achieved with an 8-pole stator and a 6-pole rotor SRM that have 8 states.

Referring to FIG. 5, depicted is a state table for four-phase switched reluctance motor states definition and relation between rotor angle and motor phase to be energized, according to specific examples of this disclosure. The table also contains definition of Sensor Reading or Sensor Data in hexadecimal format for each state and Next State for different motor operating modes like forward, reverse, forward braking, and reverse braking.

Figure 7:
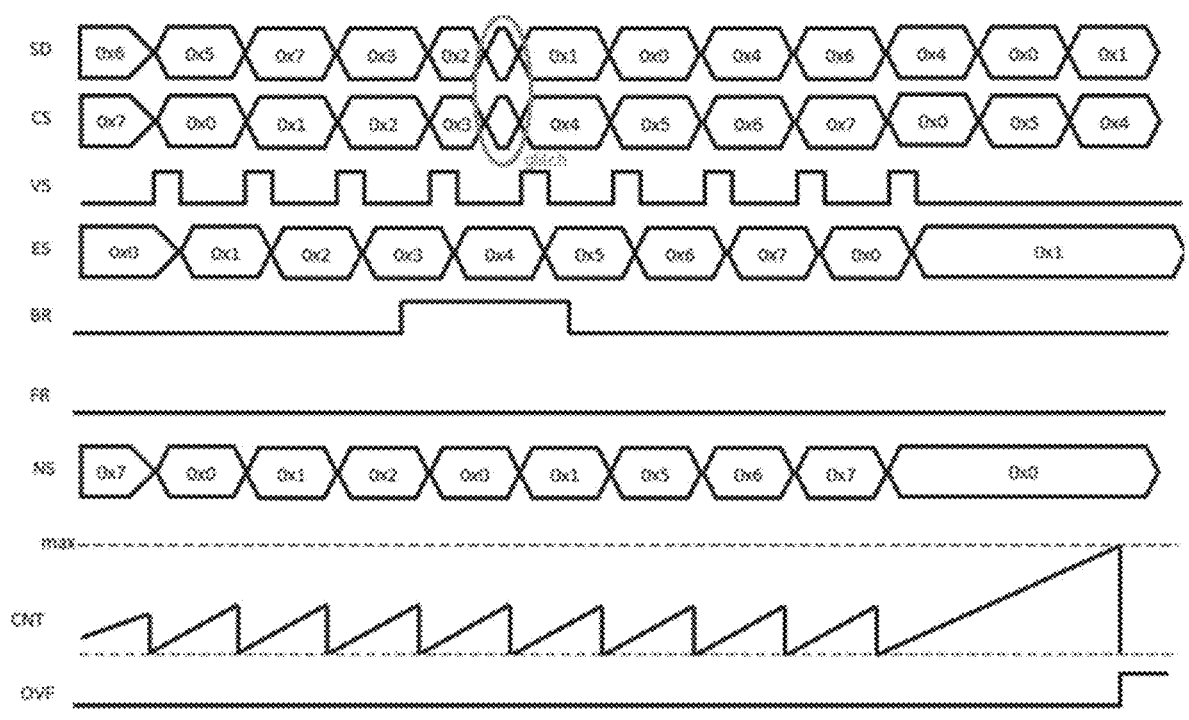
FIG. 7 illustrates a schematic waveform of an SRM rotating in a forward (counterclockwise) direction, according to specific examples of this disclosure.
Figure 8:
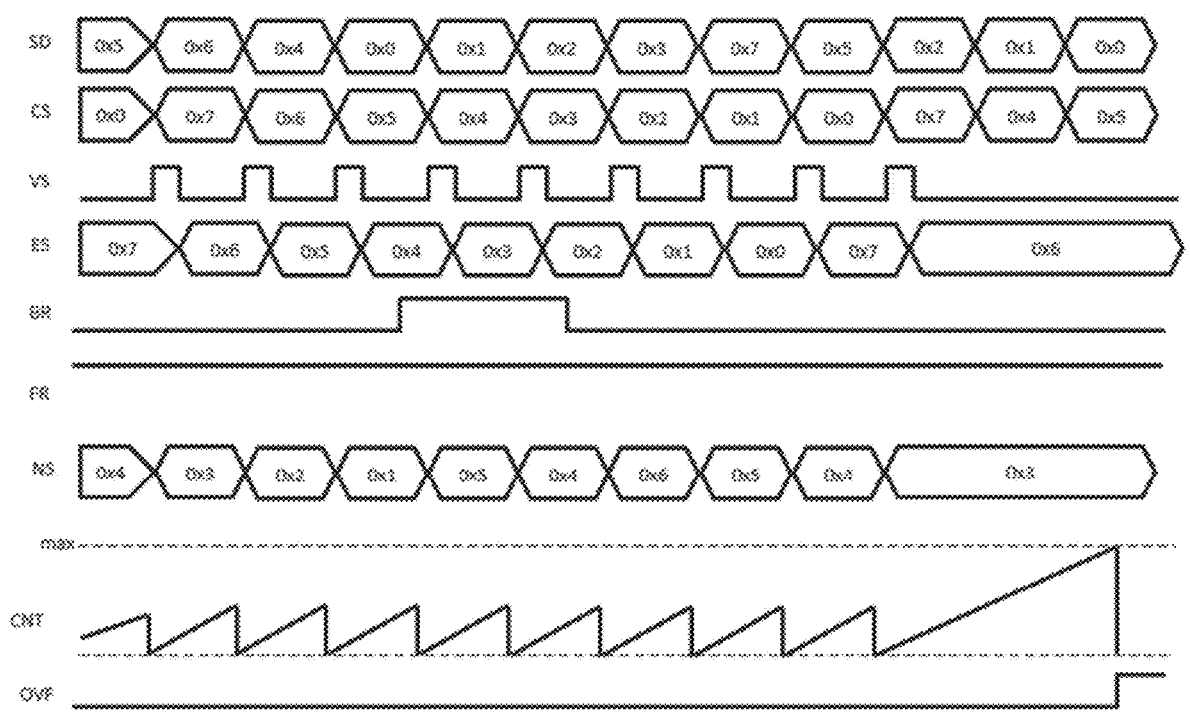
FIG. 8 illustrates a schematic waveform of an SRM rotating in a reverse (clockwise) direction, according to specific examples of this disclosure.

Referring to FIG. 6, depicted is a table of legend definitions of the waveform graphs shown in FIGS. 7 and 8, according is to specific examples of this disclosure.

Referring to FIG. 7, depicted is a schematic waveform of an SRM rotating in a forward (counterclockwise) direction, according to specific examples of this disclosure. Sensors are strategically placed on the SRM to capture the rotor position with respect to the stator. In this example the motor is set to rotate in a forward direction. Initially, the Forward/Reverse (FR) bit is set low indicating a forward rotation, and the Braking bit is set low indicating no braking. The initial state of the motor Sensor Data in hexadecimal format is 0x6, which corresponds to State 7 as defined in FIG. 5 (Current State=0x7). Based on the Sensor Data of the initial state of the rotor position, the Expected State and Next State are updated from the state table of FIG. 5 (initial Expected State=0x0; initial Next State=0X7). State 7 is energized and the motor's rotor starts rotating in a forward direction. Once the rotor rotates to an angle to change the Sensor Data to 0x5, this change in Sensor Data is detected by edge detector block and the Current State is converted to State 0 as defined in FIG. 5 (Current State=0x0) and the edge detector block generates a pulse signal to sequencer block. Sequence block then validates the state received from the edge detector block by comparing the Current State with the Expected State, in this case the Current State=0x0 and the Expected State=0x0, and generates a valid state pulse if the same Expected State is received. The sequence block then updates the Next State depending on the input conditions of the Forward/Reverse bit and the Braking bit (Next State=0x0). Later, the Valid State bit is pulsed low, the sequence block updates the Expected State based on the state table of FIG. 5 (Expected State=0x1), and the counter (CNT) is reset. The sequence block then waits until a Sensor Data that corresponds to the Expected State, or an overflow, is received. As illustrated in FIG. 7, the next Sensor Data=0x7 corresponds to State 1 as defined in FIG. 5, so the Valid State bit is again triggered high.

In FIG. 7 there are two faulty scenarios shown. In FIG. 7, it is shown how the SMMC adjusts to different fault scenarios and generates a fault when the counter achieves a maximum to trigger an overflow OVF.

In the first faulty scenario shown in FIG. 7, it is mentioned as a "glitch" where the Sensor Data changed to a state which is not the Expected State for a small duration of time and changes to the Expected State later in time. In this scenario, a Braking (BR) pulse signal is generated before the rotor rotates to an angle to change the Sensor Data to read as 0x2, which corresponds to State 3 in FIG. 5 (Current State=0x3). Notwithstanding the BR signal, sequence block validates the state received from the edge detector block with the Expected State (0x3) and generates a valid state pulse because the Current State and the Expected State both equal 0x3. However, the Sensor Data changes to something other than 0x2 at the "glitch," but an overflow (OVF) is not triggered because the Counter (CNT) has not reached a maximum. Notwithstanding the "glitch," the next reading of the Sensor Data is 0x1, which corresponds to State 4 in FIG. 5 (Current State=0x4). Sequence block validates the state received from the edge detector block because the Expected State=0x4 is the same as the Current State=0x4, and generates a valid state pulse. Thus, even though a "glitch" occurred, an overflow (OVF) is not triggered because the Counter (CNT) did not reach a maximum.

In the second faulty scenario illustrated in FIG. 7, the Sensor Data changes to multiple unexpected states in series so that the overflow (OVF) is triggered. In this scenario, the Sensor Data changes from 0x6 to 0x4 when it was expected to change from 0x6 to 0x5 for a forward, no brake operating mode, according to the states provided in FIG. 5. When Sensor Data=0x5 is read, the rotor state corresponds to State 0 in FIG. 5 (Current State=0x0). Sequence block validates the state received from the edge detector block with the Expected State (0x0) and generates a valid state pulse because the Current State and the Expected State both equal 0x0. However, as the rotor rotates, the Sensor Data is next read as 0x0, wherein the rotor state corresponds to State 5 in FIG. 5 (Current State=0x5). Because the Expected State=0x1 does not match the Current State=0x5, the sequence block does not validate the state received from the edge detector block and the Counter (CNT) is not reset. As the rotor continues to rotate, the Sensor Data is next read as 0x1, wherein the rotor state corresponds to State 4 in FIG. 5 (Current State=0x4). Because the Expected State=0x1 again does not match the Current State=0x4, the sequence block does not validate the state received from the edge detector block and the Counter (CNT) is not reset. The sequencer waits for a valid state change until the counter (CNT) reaches a maximum, which triggers an overflow (OVF).

Referring to FIG. 8, depicted is a schematic waveform of an SRM rotating in a reverse (clockwise) direction, according to specific examples of this disclosure. In this example the SRM motor is set to rotate in reverse direction. Initially, the Forward/Reverse (FR) bit is set high indicating a reverse rotation, and the Braking bit is set low indicating no braking. The initial Sensor Data is read in hexadecimal format as 0x5, which corresponds to State 4 in FIG. 5 (Current State=0x0). Based on the Sensor Data of the initial state of the rotor position, the Expected State and Next State are updated from the state table of FIG. 5 (initial Expected State=0x7; initial Next State=0x4). State 4 is energized (Current State=0x0) and the motor's rotor starts rotating in a reverse direction. Once the rotor rotates to an angle to change the Sensor Data to 0x6, this change in Sensor Data is detected by edge detector block and converted to State 3 as defined in FIG. 5 (Current State=0x7) and a pulse signal is generated to the sequence block. Sequence block validates the state received from the edge detector block by comparing Current State=0x7 with Expected State=0x7 and generates a valid state pulse if the expected state is received. Sequence block loads the Next State by checking the state of Forward/Reverse bit and braking bit. The sequence block then updates the Next State depending on the input conditions of the Forward/Reverse bit and the Braking bit (Next State=0x3). Later, the Valid State bit is pulsed low, the sequence block updates the Expected State based on the state table of FIG. 5 (Expected State=0x6), and the counter (CNT) is reset. The sequence block then waits until a Sensor Data that corresponds to the Expected State, or an overflow, is received The next Sensor Data=0x4 corresponds to State 2 as defined in FIG. 5 (Current State=0x6), so the Valid State bit is again triggered high because Current State=Expected State=0x6, State 3 is energized, Next State=0x2, Valid State is pulsed low and Expected State=0x5, the counter (CNT) is reset, and the sequence block then waits until a Sensor Data that corresponds to the Expected State, or an overflow, is received.

The motor continues in the reverse direction as Sensor Data is read 0x0 and the process repeats as described.

With continuing reference to FIG. 8, the Braking bit pulses high. The next Sensor Data=0x1 corresponds to State 0 as defined in FIG. 5 (Current State=0x4), so the Valid State bit is again triggered high because Current State=Expected State=0x4, State 2 is energized, Next State=0x5 because BR is high, Valid State is pulsed low and Expected State=0x3, the counter (CNT) is reset, and the sequence block then waits until a Sensor Data that corresponds to the Expected State, or an overflow, is received.

The Braking bit remains high as the next Sensor Data=0x2 corresponds to State 7 as defined in FIG. 5 (Current State=0x3), so the Valid State bit is again triggered high because Current State=Expected State=0x3, State 3 is energized, Next State=0x4 because BR is still high, Valid State is pulsed low and Expected State=0x2, the counter (CNT) is reset, and the sequence block then waits until a Sensor Data that corresponds to the Expected State, or an overflow, is received.

As the motor continues in the reverse direction, the Braking bit pulses low and the next Sensor Data=0x3 corresponds to State 6 as defined in FIG. 5 (Current State=0x2), so the Valid State bit is again triggered high because Current State=Expected State=0x2, State 7 is energized, Next State=0x6 because BR is now low, Valid State is pulsed low and Expected State=0x1, the counter (CNT) is reset, and the sequence block then waits until a Sensor Data that corresponds to the Expected State, or an overflow, is received.

The motor continues in the reverse direction as Sensor Data is read 0x7, 0x5, and 0x2, and the process repeats as described.

As the motor continues in the reverse direction, the next Sensor Data=0x1 corresponds to State 0 as defined in FIG. 5 (Current State=0x4), but in this case the Valid State bit is not triggered high because Current State does not equal Expected State (0x4≠0x6). No new State is energized and Expected State does not change (0x6), the counter (CNT) is not reset, and the sequence block then waits until a Sensor Data that corresponds to the Expected State, or an overflow, is received.

The motor continues in the reverse direction and the next Sensor Data=0x0 corresponds to State 1 as defined in FIG. 5 (Current State=0x5), but the Valid State bit is again not triggered high because Current State does not equal Expected State (0x1≠0x6). No new State is energized and Expected State does not change (0x6), the counter (CNT) is not reset, and the sequence block then waits until a Sensor Data that corresponds to the Expected State, or an overflow, is received. The Counter (CNT) continues to increase until it reaches a maximum and an Overflow (OVF) is triggered.

Figure 9:
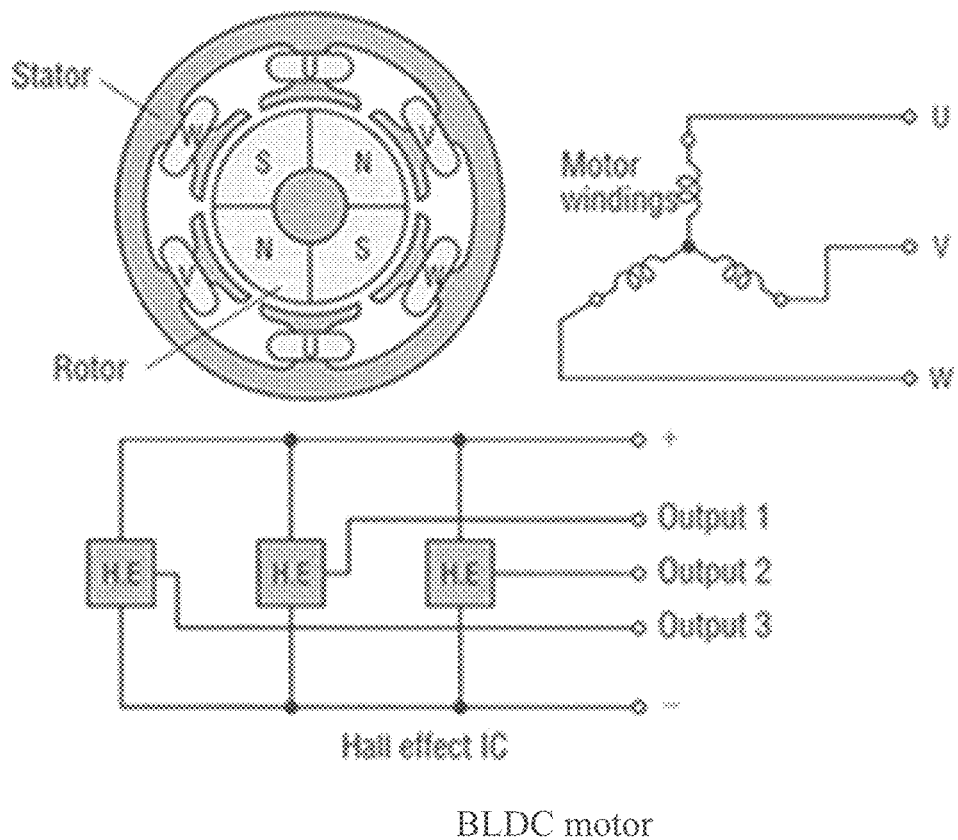
FIG. 9 illustrates schematic diagrams of a cross section, motor winding connections and Hall effect sensors for a brushless direct current (BLDC) motor, according to the teachings of this disclosure.

Referring to FIG. 9, cross-sectional schematic diagrams of motor winding connections and Hall effect sensors are shown for a brushless direct current (BLDC) motor, according to the teachings of this disclosure. A brushless DC (BLDC) motor, also called an electronically commutated motor, has a three-phase stator and a permanent magnet rotor. In BLDC motors, an electronic servo system replaces the mechanical commutator contacts. Stator coils are connected in a manner where three lines are bought out of the motor to provide switched DC power. For this BLDC motor, the SMMC interface has six (6) power MOSFET switches (not shown but similar to FIG. 2), two each per phase. Where one is used to connect to +ve supply and the other to the return path. At any given point, one phase is energized with +ve voltage and another phase is connected to the return path. Based on the above control method, the BLDC controlling circuit can be defined as having six (6) states as shown in the table of FIG. 11.

Figure 10:
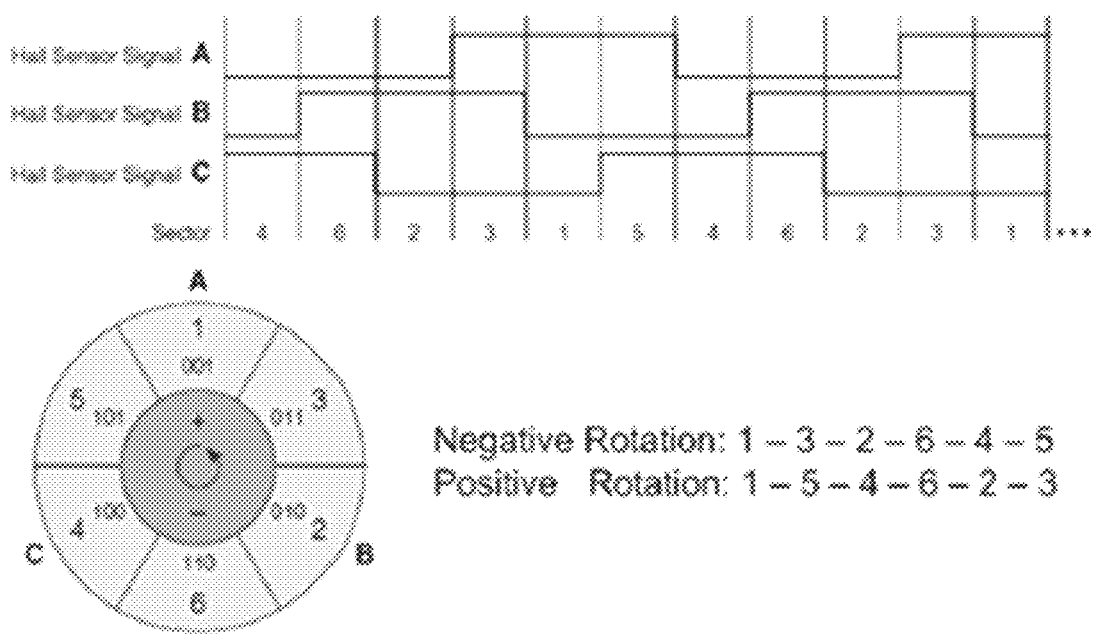
FIG. 10 illustrates schematic diagrams of Hall sensor states and positions for a brushless direct current (BLDC) motor, according to the teachings of this disclosure.

Referring to FIG. 10, depicted are schematic diagrams of Hall sensor states and positions for a brushless direct current (BLDC) motor, according to the teachings of this disclosure. If the BLDC motor has sensors, e.g., Hall Effect sensors, for detecting state changes while the motor is running, then the SMMC interface disclosed herein may be used to control the BLDC motor.

Figure 13:
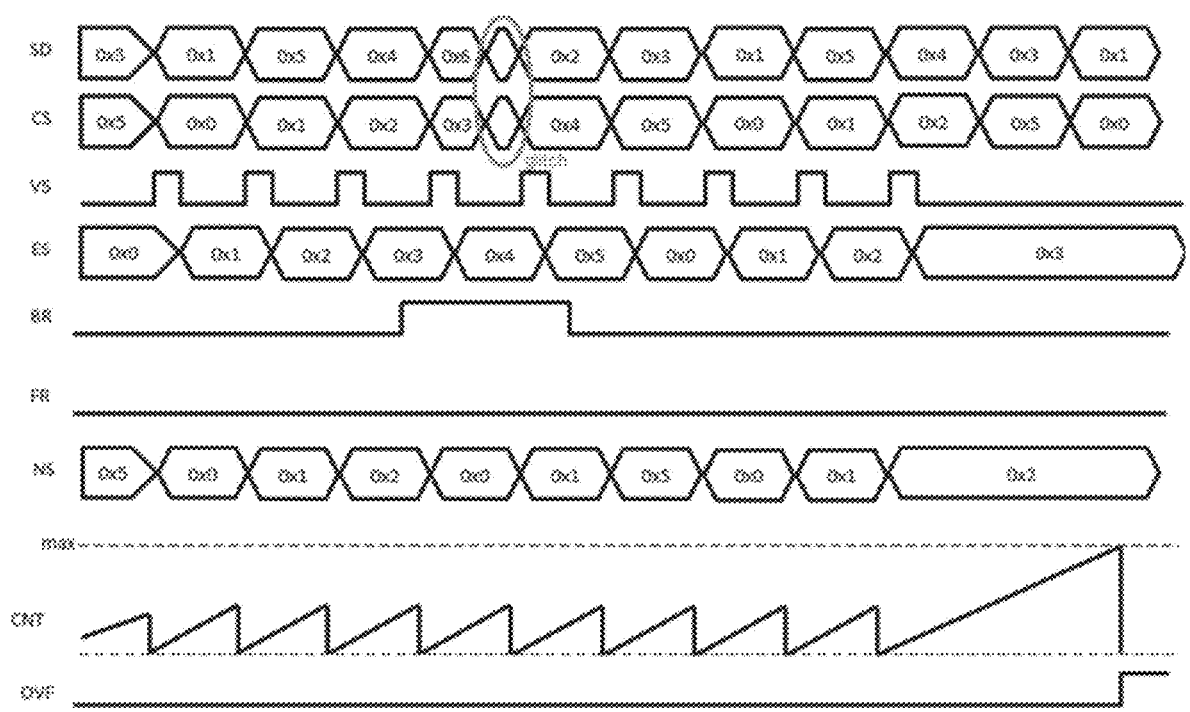
FIG. 13 illustrates a schematic waveform of a BLDC motor rotating in a forward (counterclockwise) direction, according to specific examples of this disclosure.
Figure 14:
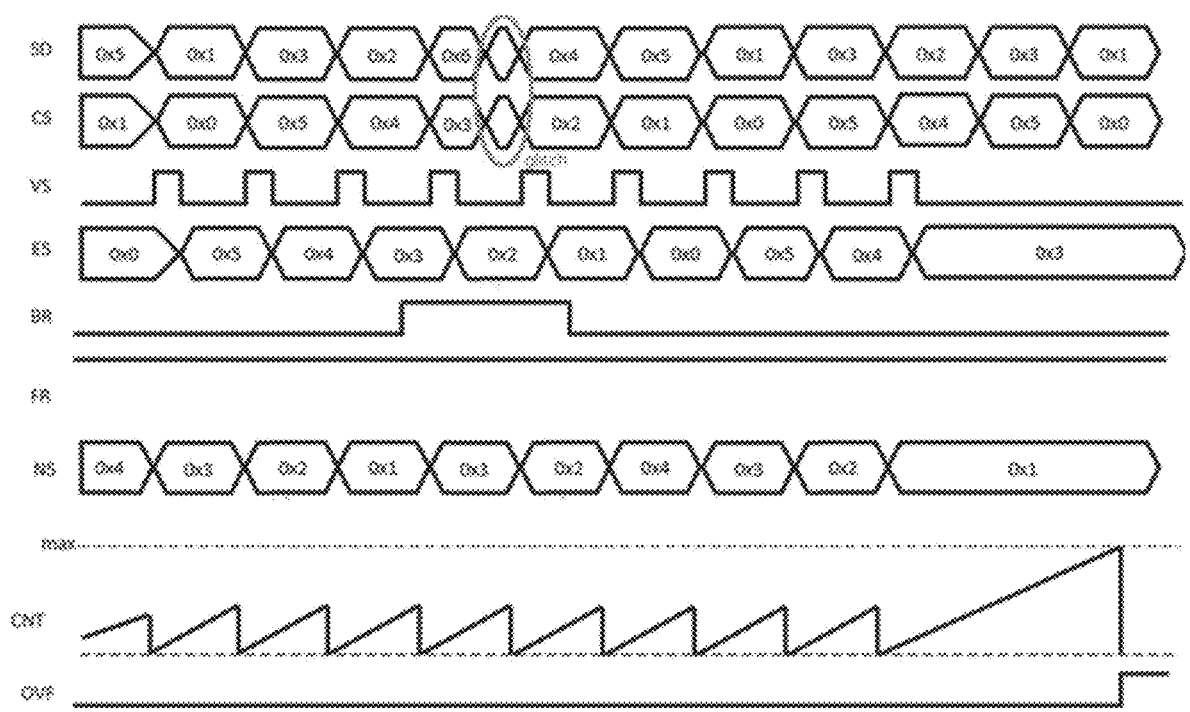
FIG. 14 illustrates a schematic waveform of a BLDC motor rotating in a reverse (clockwise) direction, according to specific examples of this disclosure.

Referring to FIG. 12, depicted is a table of legend definitions of the waveform graphs shown in FIGS. 13 and 14, according to specific examples of this disclosure.

Referring to FIG. 13, depicted is a schematic waveform of a BLDC motor rotating in a forward (counterclockwise) direction, according to specific examples of this disclosure. Initially, the Forward/Reverse (FR) bit is set low indicating a forward rotation, and the Braking bit is set low indicating no braking. The initial state of the motor Sensor Data in hexadecimal format is 0x3, which corresponds to State 5 as defined in FIG. 11 in hexadecimal format (Current State=0x5). Based on the Sensor Data of the initial state of the rotor position, the Expected State and Next State are updated from the state table of FIG. 11 (initial Expected State=0x0; initial Next State=0x5). State 5 is energized and the motor's rotor starts rotating in a forward direction. Once the rotor rotates to an angle to change the Sensor Data to 0x1, this change in Sensor Data is detected by edge detector block and the Current State is converted to State 0 as defined in FIG. 11 (Current State=0x0), and the edge detector block generate a pulse signal to sequencer block. Sequence block then validates the state received from the edge detector block by comparing the Current State with the Expected State, in this case the Current State=0x0 and the Expected State=0x0, and generates a valid state pulse if the Expected State is received. State 0 is energized and the motor's rotor continues rotating in a forward direction. The sequence block then updates the Next State depending on the input conditions of the Forward/Reverse bit and the Braking bit (Next State=0x0). Later, the Valid State bit is pulsed low, the sequence block updates the Expected State based on the state table of FIG. 11 (Expected State=0x1), and the counter (CNT) is reset. The sequence block then waits until a Sensor Data that corresponds to the Expected State, or an overflow, is received.

The next Sensor Data=0x5 corresponds to State 1 as defined in FIG. 11 (Current State=0x1), so the Valid State bit is again triggered high because Current State=Expected State=0x1, State 1 is energized, Next State=0x1, Valid State is pulsed low and Expected State=0x2, the counter (CNT) is reset, and the sequence block then waits until a Sensor Data that corresponds to the Expected State, or an overflow, is received.

The next Sensor Data=0x4 corresponds to State 2 as defined in FIG. 11 (Current State=0x2), so the Valid State bit is again triggered high because Current State=Expected State=0x2, State 2 is energized, Next State=0x2, Valid State is pulsed low and Expected State=0x3, the counter (CNT) is reset, and the sequence block then waits until a Sensor Data that corresponds to the Expected State, or an overflow, is received.

With continuing reference to FIG. 13, the Braking bit pulses high. The next Sensor Data=0x6 corresponds to State 3 as defined in FIG. 11 (Current State=0x3), so the Valid State bit is again triggered high because Current State=Expected State=0x3, State 3 is energized, Next State=0x0 because BR is high, Valid State is pulsed low and Expected State=0x4, the counter (CNT) is reset, and the sequence block then waits until a Sensor Data that corresponds to the Expected State, or an overflow, is received. However, a "glitch" occurs reading the Sensor Data, but no action is taken until the sequence block receives a Sensor Data that corresponds to the Expected State, or an overflow.

The Braking bit remains high as the next Sensor Data=0x2 corresponds to State 4 as defined in FIG. 11 (Current State=0x4), so the Valid State bit is again triggered high because Current State=Expected State=0x4, State 4 is energized, Next State=0x1 because BR is high, Valid State is pulsed low and Expected State=0x5, the counter (CNT) is reset, and the sequence block then waits until a Sensor Data that corresponds to the Expected State, or an overflow, is received.

As the motor continues in the forward direction, the Braking bit pulses low and the next Sensor Data=0x3 corresponds to State 5 as defined in FIG. 11 (Current State=0x5), so the Valid State bit is again triggered high because Current State=Expected State=0x5, State 5 is energized, Next State=0x5 because BR is now low, Valid State is pulsed low and Expected State=0x0, the counter (CNT) is reset, and the sequence block then waits until a Sensor Data that corresponds to the Expected State, or an overflow, is received.

The motor continues in the forward direction as Sensor Data is read 0x1, 0x5 and 0x4, and the process repeats a described.

As the motor continues in the forward direction, the next Sensor Data=0x3 corresponds to State 5 as defined in FIG. 11 (Current State=0x5), but in this case the Valid State bit not triggered high because Current State does not equal Expected State (0x5≠0x3). No State is energized and Expected State does not change (0x3), the counter (CNT) is not reset, and the sequence block then waits until a Sensor Data that corresponds to the Expected State, or an overflow, is received.

The motor continues in the forward direction and the next Sensor Data=0x1 corresponds to State 0 as defined in FIG. 11 (Current State=0x0), but the Valid State bit is again not triggered high because Current State does not equal Expected State (0x0≠0x3). No State is energized and Expected State does not change (0x3), the counter (CNT) is not reset, and the sequence block then waits until a Sensor Data that corresponds to the Expected State, or an overflow, is received. The Counter (CNT) continues to increase until it reaches a maximum and an Overflow (OVF) is triggered.

Referring to FIG. 14, depicted is a schematic waveform of a BLDC motor rotating in a reverse (clockwise) direction, according to specific examples of this disclosure. Initially, the Forward/Reverse (FR) bit is set high indicating a reverse rotation, and the Braking bit is set low indicating no braking. The initial state of the Sensor Data=0x5, which corresponds to State 4 as defined in FIG. 11 (Current State=0x1). Based on the Sensor Data of the initial state of the rotor position, the Expected State and Next State are updated from the state table of FIG. 11 (initial Expected State=0x0; initial Next State=0x3). State 4 is energized and the motor's rotor starts rotating in a reverse direction. Once the rotor rotates to an angle to change the Sensor Data to 0x1, this change in Sensor Data is detected by edge detector block and the Current State is converted to State 3 as defined in FIG. 11 (Current State=0x0), and the edge detector block generate a pulse signal to sequencer block. Sequence block then validates the state received from the edge detector block by comparing the Current State with the Expected State, in this case the Current State=0x0 and the Expected State=0x0, and generates a valid state pulse if the Expected State is received. State 3 is energized and the motor's rotor continues rotating in a reverse direction. The sequence block then updates the Next State depending on the input conditions of the Forward/Reverse bit and the Braking bit (Next State=0x3). Later, the Valid State bit is pulsed low, the sequence block updates the Expected State based on the state table of FIG. 11 (Expected State=0x2), and the counter (CNT) is reset. The sequence block then waits until a Sensor Data that corresponds to the Expected State, or an overflow, is received.

The next Sensor Data=0x3 corresponds to State 2 as defined in FIG. 11 (Current State=0x2), so the Valid State bit is again triggered high because Current State=Expected State=0x2, State 2 is energized, Next State=0x2, Valid State is pulsed low and Expected State=0x1, the counter (CNT) is reset, and the sequence block then waits until a Sensor Data that corresponds to the Expected State, or an overflow, is received.

The motor continues in the reverse direction as Sensor Data is read 0x2 and the process repeats as described.

With continuing reference to FIG. 14, the Braking bit pulses high. The next Sensor Data=0x6 corresponds to State 3 as defined in FIG. 11 (Current State=0x3), so the Valid State bit is again triggered high because Current State=Expected State=0x3, State 3 is energized, Next State=0x3 because BR is high, Valid State is pulsed low and Expected State=0x2, the counter (CNT) is reset, and the sequence block then waits until a Sensor Data that corresponds to the Expected State, or an overflow, is received. However, a "glitch" occurs reading the Sensor Data, but no action is taken until the sequence block receives a Sensor Data that corresponds to the Expected State, or an overflow.

The Braking bit remains high as the next Sensor Data=0x4 corresponds to State 2 as defined in FIG. 11 (Current State=0x2), so the Valid State bit is again triggered high because Current State=Expected State=0x2, State 2 is energized, Next State=0x2 because BR is high, Valid State is pulsed low and Expected State=0x1, the counter (CNT) is reset, and the sequence block then waits until a Sensor Data that corresponds to the Expected State, or an overflow, is received.

As the motor continues in the reverse direction, the Braking bit pulses low and the next Sensor Data=0x5 corresponds to State 4 as defined in FIG. 11 (Current State=0x4), so the Valid State bit is again triggered high because Current State=Expected State=0x1, State 3 is energized, Next State=0x4 because BR is now low, Valid State is pulsed low and Expected State=0x0, the counter (CNT) is reset, and the sequence block then waits until a Sensor Data that corresponds to the Expected State, or an overflow, is received.

The motor continues in the forward direction as Sensor Data is read 0x1, 0x3 and 0x2, and the process repeats as described.

As the motor continues in the reverse direction, the next Sensor Data=0x3 corresponds to State 2 as defined in FIG. 11 (Current State=0x5), but in this case the Valid State bit not triggered high because Current State does not equal Expected State (0x5≠0x3). No new State is energized and Expected State does not change (0x3), the counter (CNT) is not reset, and the sequence block then waits until a Sensor Data that corresponds to the Expected State, or an overflow, is received.

The motor continues in the reverse direction and the next Sensor Data=0x1 corresponds to State 3 as defined in FIG. 11 (Current State=0x0), but the Valid State bit is again not triggered high because Current State does not equal Expected State (0x0≠0x3). No new State is energized and Expected State does not change (0x3), the counter (CNT) is not reset, and the sequence block then waits until a Sensor Data that corresponds to the Expected State, or an overflow, is received. The Counter (CNT) continues to increase until it reaches a maximum and an Overflow (OVF) is triggered The present disclosure has been described in terms of one or more examples, and many equivalents, alternatives, variations, and modifications, aside from those expressly stated, are possible and within the scope of the disclosure. While the present disclosure is susceptible to various modifications and alternative forms, specific examples thereof have been shown in the drawings and are herein described in detail. The description herein of specific examples is not intended to limit the disclosure to the particular forms disclosed herein.

What is claimed is:

1. A state machine motor controller interface, comprising:
    an edge detector having a plurality of first inputs and a plurality of first outputs,
        wherein each of the plurality of first inputs is adapted for coupling to a respective one of a plurality of position sensors whereby each of the plurality of position sensors indicates a different motor rotor angle range,
        when a first input receives a sensor output from an associated position sensor, a state thereof is determined based upon a sensor output logic value, wherein each state is defined by a logic value stored in a register and compared with the sensor output logic value, and
        wherein one of the plurality of first outputs provides the state and another one of the plurality of first outputs provides a state change pulse output;

a sequencer comprising
    a state input coupled to the state output from the edge detector,
    a state change pulse input coupled to the state change pulse output from the edge detector,
    a valid state change event/interrupt output, and
    a plurality of definition registers for defining expected states,
    comparison logic for validating the state received from the edge detector with an associated one of the expected states,
        a next expected state is updated if the received state is valid before an overflow output is received from a counter and a valid state change event/interrupt is generated, and if the received state is not valid, then until a next counter overflow condition the next expected state is not updated and a fault interrupt is generated;
the counter having a clock input coupled to a clock and a count value output,
    wherein the counter increments a count value for a clock pulse received until a valid state pulse is received from the sequencer,
    whereby the count value will be stored in a count register of the counter and the count value of the counter will be reset to zero, and
    if the count value exceeds a maximum count then the overflow output will be generated.

2. The state machine motor controller interface according to claim 1, wherein the defined states are selected from one or more states of forward, reverse, forward braking and reverse braking.

3. The state machine motor controller interface according to claim 1, wherein the sequencer further comprises a control register specifying a number of rotor states to be received from the edge detector, whereby the sequencer is configurable for the number of rotor states.

4. The state machine motor controller interface according to claim 1, wherein the edge detector is configurable to define a correlation of the at least one input of a rotor position to the at least one rotor state.

5. The state machine motor controller interface according to claim 1, wherein the sequencer further comprise a rotor forward/reverse input and the sequencer is configurable for either forward or reverse rotor rotation via the rotor forward/reverse input.

6. The state machine motor controller interface according to claim 1, wherein the sequencer further comprise a rotor braking input and the sequencer is configurable for either braking or nonbraking rotor rotation via the rotor braking input.

7. The state machine motor controller interface according to claim 1, wherein a next expected state is configurable for a mode of operation selected from: forward motor rotation, reverse motor rotation, braking forward motor rotation, and braking reverse motor rotation.

8. The state machine motor controller interface according to claim 1, wherein the sequencer further comprises: a valid state pulse output to the counter, and a fault condition output.

9. The state machine motor controller interface according to claim 1, wherein the sequencer further comprises an overflow input from the counter, wherein the counter is configurable to define the maximum count value, and wherein the counter outputs the overflow to the sequencer when the maximum count value is exceeded.

10. A state machine motor controller comprising:
a processor;
    a non-transitory storage medium comprising a set of computer readable instructions stored in the non-transitory storage medium and when executed by the processor configured to control the controller to:
    calculate rotor states based on user-defined parameters and store rotor states in a plurality of definition registers for defining expected rotor states;
    determine an initial rotor state based on rotor position input data;
    store a next rotor state in a plurality of definition registers for defining next rotor states;
    store an expected rotor state in the plurality of definition registers for defining expected rotor states;
    detect changes in rotor state based on the rotor position input data;
    validate a rotor state as an expected rotor state and reset a counter;
    determine the next rotor state based on the user-defined parameters and the expected rotor state stored in the plurality of definition registers for defining expected rotor states and load the next rotor state in one of the plurality of registers for defining expected rotor states; and
    update the expected rotor state with the next rotor state.

11. The state machine motor controller according to claim 10, wherein the rotor states are selected from one or more states of forward, reverse, forward braking and reverse braking.

12. The state machine motor controller according to claim 10, wherein the non-transitory storage medium comprises the set of computer readable instructions stored in the non-transitory storage medium and when executed by the processor configured to control the controller to: store a value specifying the number of states, whereby the controller is configurable for a number of rotor states.

13. The state machine motor controller according to claim 10, wherein the set of computer readable instructions stored in the non-transitory storage medium and when executed by the processor is further configured to control the controller to be configurable to define a correlation of the at least one input of a rotor position to the at least one rotor state.

14. The state machine motor controller according to claim 10, wherein the non-transitory storage medium comprises the set of computer readable instructions stored in the non-transitory storage medium and when executed by the processor configured to control the controller to: store a rotor direction specifying a direction selected from forward and reverse, whereby the controller is configurable for either forward or reverse rotor rotation.

15. The state machine motor controller according to claim 10, wherein the non-transitory storage medium comprises the set of computer readable instructions stored in the non-transitory storage medium and when executed by the processor configured to control the controller to: store a rotor braking condition specifying a condition selected from braking and nonbraking, whereby the controller is configurable for either braking or nonbraking rotation.

16. The state machine motor controller according to claim 10, wherein a next expected state is configurable for a mode of operation selected from: forward motor rotation, reverse motor rotation, braking forward motor rotation, and braking reverse motor rotation.

17. The state machine motor controller according to claim 10, wherein the set of computer readable instructions stored in the non-transitory storage medium and when executed by the processor is further configured to control the controller to count clock pulses to update a count value, output a valid state pulse when a rotor state corresponds to an expected rotor state, and reset the count value.

18. The state machine motor controller according to claim 10, wherein the set of computer readable instructions stored in the non-transitory storage medium and when executed by the processor is further configured to control the controller to count clock pulses to update a count value, compare the count value to a maximum count value, and generate an overflow when the count value exceeds the maximum count value.

19. A state machine motor controller comprising:
a processor; and
a non-transitory storage medium comprising a set of computer readable instructions stored in the non-transitory storage medium and when executed by the processor configured to control the controller to:
store user-defined parameters comprising a value specifying a number of rotor states, a rotor direction specifying a direction selected from forward and reverse, a rotor braking condition specifying a condition selected from braking and nonbraking, and a maximum count value;
calculate rotor states based on the user-defined parameters and store the rotor states in a plurality of definition registers for defining expected rotor states;
determine an initial rotor state based on rotor position input data;
store a next rotor state in the plurality of definition registers for defining next rotor states;
store an expected rotor state in the plurality of definition registers for defining expected rotor states;
correlate the rotor position input data with rotor states;
detect changes in rotor state based on the rotor position input data;
validate a rotor state as an expected rotor state and reset a counter;
determine the next rotor state based on the user-defined parameters and the expected rotor state stored in the plurality of definition registers for defining expected rotor states and load the next rotor state in one of the plurality of registers for defining expected rotor states;
update the expected rotor state with the next rotor state; and
count clock pulses to update a count value, compare the count value to the maximum count value, and generate an overflow when the count value exceeds the maximum count value.

20. The state machine motor controller as claimed in claim 19, wherein the rotor states are selected from one or more states of forward, reverse, forward braking and reverse braking.

* * * * *